United States Patent
Cheng et al.

(10) Patent No.: US 9,436,599 B2
(45) Date of Patent: Sep. 6, 2016

(54) FLASH STORAGE DEVICE AND METHOD INCLUDING SEPARATING WRITE DATA TO CORRESPOND TO PLURAL CHANNELS AND ARRANGING THE DATA IN A SET OF CACHE SPACES

(71) Applicant: Silicon Motion, Inc., Jhubei, Hsinchu County (TW)

(72) Inventors: Chang-Kai Cheng, Hsinchu (TW); Kuan-Yu Ke, Jhubei (TW)

(73) Assignee: SILICON MOTION, INC., Jhubei, Hsinchu County (TW)

( * ) Notice: Subject to any disclaimer, the term of this patent is extended or adjusted under 35 U.S.C. 154(b) by 129 days.

(21) Appl. No.: 14/100,575

(22) Filed: Dec. 9, 2013

(65) Prior Publication Data

US 2014/0250258 A1    Sep. 4, 2014

(30) Foreign Application Priority Data

Mar. 1, 2013 (TW) .............................. 102107206 A (51) Int. Cl.
*G06F 12/02* (2006.01)
*G06F 12/08* (2016.01)

(52) U.S. Cl.
CPC ....... *G06F 12/0246* (2013.01); *G06F 12/0873* (2013.01); *G06F 12/0802* (2013.01); *G06F 2212/2022* (2013.01); *G06F 2212/7203* (2013.01); *G06F 2212/7208* (2013.01)

(58) Field of Classification Search
CPC ................... G06F 12/0246; G06F 2212/2022; G06F 2212/7203; G06F 2212/7208; G06F 12/0802; G06F 12/0873
See application file for complete search history.

(56) References Cited

U.S. PATENT DOCUMENTS

| | | | | |
|---|---|---|---|---|
| 7,873,777 B2* | 1/2011 | Kang | ............................ | 711/103 |
| 2007/0288688 A1* | 12/2007 | Kang | .................. | G06F 12/0246 |
| | | | | 711/103 |
| 2010/0125695 A1* | 5/2010 | Wu | ....................... | G06F 3/0613 |
| | | | | 711/103 |
| 2010/0241792 A1* | 9/2010 | Lee | ............................. | 711/103 |
| 2010/0274976 A1* | 10/2010 | Kang et al. | ................... | 711/154 |
| 2011/0035538 A1* | 2/2011 | Kim et al. | .................... | 711/103 |
| 2011/0072195 A1* | 3/2011 | Lin | ................ | 711/103 |
| 2011/0271039 A1* | 11/2011 | Baek et al. | .................... | 711/103 |
| 2012/0079170 A1* | 3/2012 | Chang et al. | ................. | 711/103 |
| 2013/0297858 A1* | 11/2013 | Schneier | ........................ | 711/103 |

* cited by examiner

*Primary Examiner* — Sanjiv Shah
*Assistant Examiner* — Glenn Gossage
(74) *Attorney, Agent, or Firm* — McClure, Qualey & Rodack, LLP (57) ABSTRACT

A data storage device with a FLASH memory accessed via multiple channels and a FLASH memory control method are disclosed. The control method includes dividing a plurality of blocks of a FLASH memory into groups to be accessed by a plurality of channels separately, each block comprising a plurality of pages; allocating a random access memory to provide a first set of cache spaces for the different ones of the plurality of channels; separating write data issued from a host to correspond to the plurality of channels; and after data arrangement in the first set of cache spaces for every channel is completed, writing data arranged in the first set of cache spaces for every channel to the FLASH memory via the plurality of channels. The control method further includes allocating the random access memory to provide a second set of cache spaces; and using the second set of cache spaces to perform data arrangement for the write data issued from the host when writing the data arranged in the first set of cache spaces for every channel to the FLASH memory.

8 Claims, 7 Drawing Sheets

FLASH STORAGE DEVICE AND METHOD INCLUDING SEPARATING WRITE DATA TO CORRESPOND TO PLURAL CHANNELS AND ARRANGING THE DATA IN A SET OF CACHE SPACES

CROSS REFERENCE TO RELATED APPLICATIONS

This Application claims priority of Taiwan Patent Application No. 102107206, filed on Mar. 1, 2013, the entirety of which is incorporated by reference herein.

BACKGROUND OF THE INVENTION

1. Field of the Invention

The present invention relates to a data storage space with a FLASH memory and a FLASH memory control method.

2. Description of the Related Art

FLASH memory is commonly used as a storage medium in today's data storage devices. A NAND Flash, for example, is primarily used in memory cards, Universal Serial Bus (USB) flash devices, solid-state drives (SSDs) and so on. By a multi-chip package technique, a NAND FLASH chip and a controller chip may be combined into one package, named eMMC (embedded MultiMediaCard).

Today, FLASH memory is widely used with considerably increased storage capacity while the semiconductor process is improved. For a FLASH memory with a huge storage capacity, the operation efficiency relies heavily on the FLASH memory control method.

BRIEF SUMMARY OF THE INVENTION

A data storage device with a FLASH memory and a FLASH memory control method are disclosed.

A data storage device in accordance with an exemplary embodiment of the invention comprises a FLASH memory and a controller. The FLASH memory comprises a plurality of blocks each with a plurality of pages. The blocks are further grouped to be accessed via a plurality of channels. The controller is coupled to the FLASH memory. The controller comprises a computing unit, a read only memory and a random access memory. The program loaded in the read only memory is executed by the computing unit to build firmware for the data storage device. According to the computing unit executing the firmware, the random access memory is allocated to provide at least one set of cache spaces, for temporary write data storage for the different channels. By the computing unit, write data issued from a host is separated to correspond to the plurality of channels. When data arrangement for every channel has been completed in one set of cache spaces, the computing unit writes the data that has been arranged in the set of cache spaces to the FLASH memory via the plurality of channels corresponding to the different cache spaces of the set of cache spaces.

In another exemplary embodiment of the disclosure, a FLASH memory control method is shown, which includes the following steps: dividing a plurality of blocks of a FLASH memory into groups to be accessed via different channels; allocating at least one set of cache spaces in a random access memory for temporary write data storage for the different channels; separating write data issued from a host to correspond to the plurality of channels; and, when data arrangement for every channel has been completed in one set of cache spaces, writing the data that has been arranged in the set of cache spaces to the FLASH memory via the plurality of channels corresponding to the different cache spaces of the set of cache spaces.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description shows several exemplary embodiments carrying out the invention. This description is made for the purpose of illustrating the general principles of the invention and should not be taken in a limiting sense. The scope of the invention is best determined by reference to the appended claims.

Figure 1:
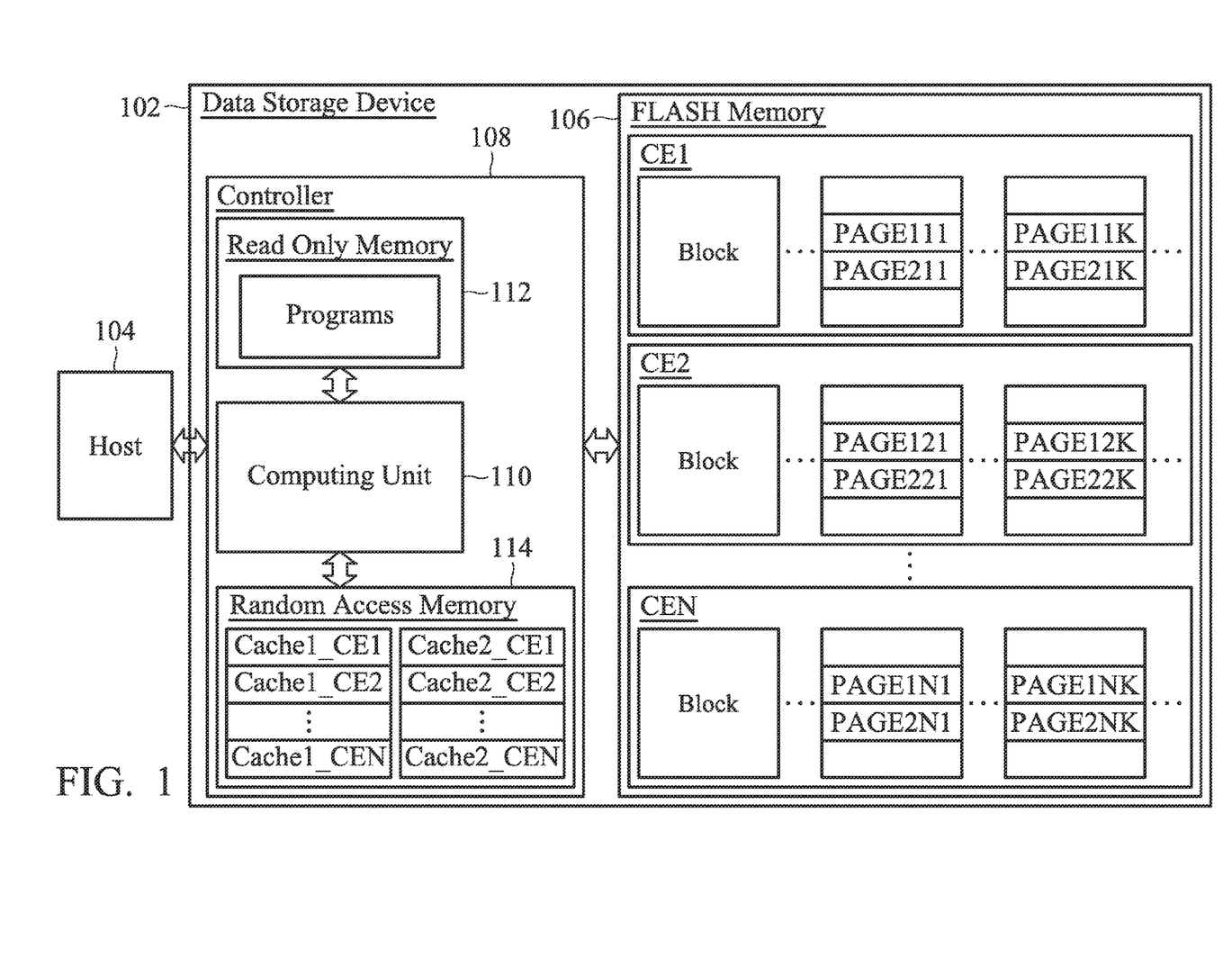
FIG. 1 depicts a data storage device 102 in accordance with an exemplary embodiment of the invention, which communicates with a host 104.

FIG. 1 shows a data storage device 102 in accordance with an exemplary embodiment of the disclosure, which communicates with a host 104. The data storage device 102 comprises a FLASH memory 106 and a controller 108.

The design of the FLASH memory 106 is discussed in this paragraph. To process multiple instructions at the same time, the FLASH memory 106 is operated according to a multi-channel technique. In the FLASH memory 106, the blocks of space are grouped into several groups to be accessed via different channels. As shown, the FLASH memory 106 is implemented by multiple chips CE1, CE2 . . . CEN (e.g., a chip enabled technique) which are accessed via different channels. Each chip corresponds to one channel. Each chip provides a plurality of blocks. Each block has a plurality of pages (e.g. PAGE111 to PAGE2NK are pages of space). For each chip, only one access operation is allowed at a time. The multiple chips are provided for implementing multiple access operations at the FLASH memory 106 at the same time.

The design of the controller 108 is discussed in the following paragraphs.

The controller 108 is coupled to the FLASH memory 106. The controller 108 comprises a computing unit 110, a read only memory 112 and a random access memory 114. A program loaded in the read only memory 112 is executed by the computing unit 110 to build firmware for the data storage device 102. According to the computing unit 110 executing the firmware, the random access memory 114 is allocated to provide at least one set of cache spaces. In the exemplary embodiment of FIG. 1, two sets of cache spaces are provided, including a first set of cache spaces Cache1_CE1, Cache1_CE2 to Cache1_CEN and a second set of cache spaces Cache2_CE1, Cache2_CE2 to Cache2_CEN. Each set of cache spaces provides the different channels corresponding to the different chips CE1, CE2 to CEN with cache spaces, each of a unit size for a FLASH memory write operation, for data arrangement. For example, referring to the first set of cache spaces, the cache spaces Cache1_CE1, Cache1_CE2 to Cache1_CEN are allocated to correspond to the chips CE1, CE2 to CEN, respectively, for data arrangement. The cache spaces Cache1_CE1, Cache1_CE2 to Cache1_CEN are each a unit size for a FLASH memory write operation. Furthermore, referring to the second set of cache spaces, the cache spaces Cache2_CE1, Cache2_CE2 to Cache2_CEN are allocated to correspond to the chips CE1, CE2 to CEN, respectively, for data arrangement. The cache spaces Cache2_CE1, Cache2_CE2 to Cache2_CEN are each a unit size for a FLASH memory write operation. In an exemplary embodiment, a FLASH memory write operation is performed to write data in a unit size named "super page." Each super page includes K pages, where K is a number. Thus, it is allowed to write K pages (i.e. one super page) into the FLASH memory 106 in one write instruction, effectively reducing the number of instructions.

The allocation of the FLASH memory 106 is discussed in this paragraph. The computing unit 110 separates the write data issued from the host 104 to correspond to the channels corresponding to the chips CE1, CE2 to CEN. The write data is separated and temporarily stored into one set of cache spaces, e.g., the first set of cache spaces Cache1_CE1, Cache1_CE2 to Cache1_CEN, to be combined with data retrieved from the FLASH memory 106. When every channel is provided with a unit size of data for a FLASH write operation, e.g., the first set of cache spaces Cache1_CE1, Cache1_CE2 to Cache1_CEN is full, the computing unit 110 moves data from the first set of cache spaces Cache1_CE1, Cache1_CE2 to Cache1_CEN to the FLASH memory 106. Note that when copying the data from the first set of cache spaces Cache1_CE1, Cache1_CE2 to Cache1_CEN to the FLASH memory 106, the computing unit 110 is switched to use the second set of cache spaces Cache2_CE1, Cache2_CE2 to Cache2_CEN to arrange the new data issued from the host 104. The first set of cache spaces Cache1_CE1, Cache1_CE2 to Cache1_CEN and the second set of cache spaces Cache2_CE1, Cache2_CE2 to Cache2_CEN are alternately utilized for data arrangement.

Figure 2:
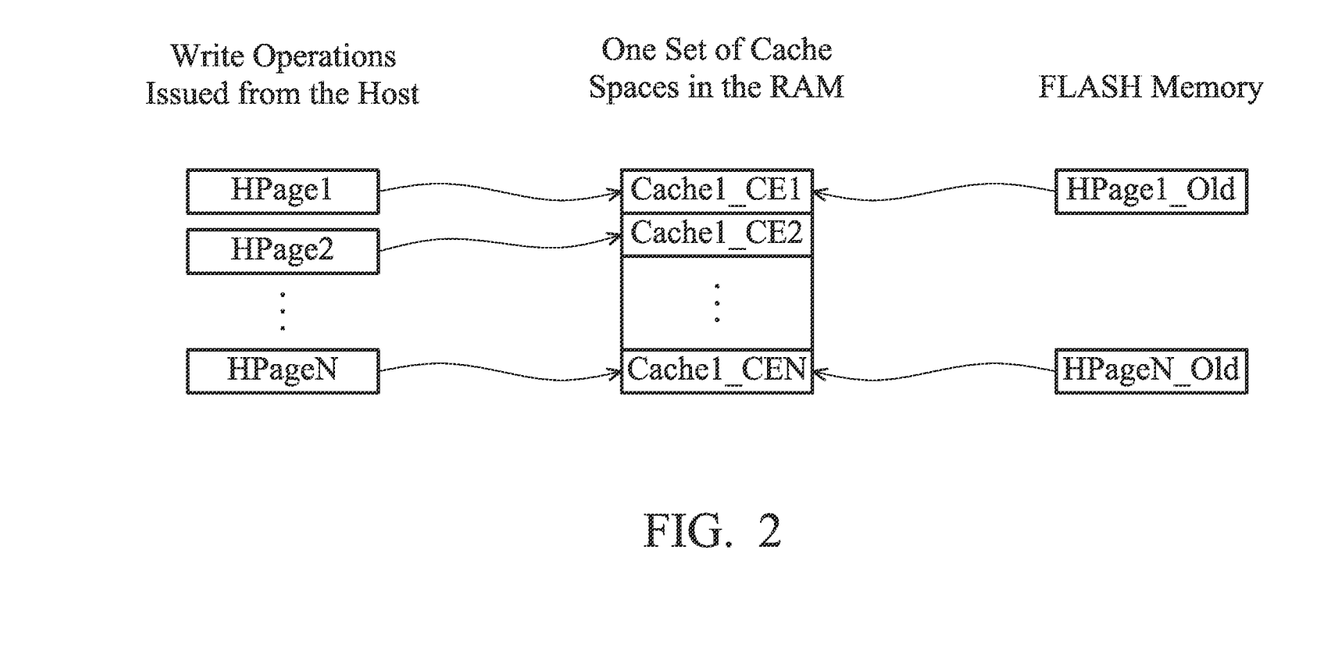
FIG. 2 depicts data arrangement in accordance with an exemplary embodiment of the invention.

FIG. 2 depicts data arrangement in accordance with an exemplary embodiment of the invention, wherein the first set of cache spaces Cache1_CE1, Cache1_CE2 to Cache1_CEN is utilized. The host 104 issues write operations for writing data onto the host pages HPage1, HPage2 to HPageN. The computing unit 110 distributes the different logical addresses for host pages HPage1, HPage2 to HPageN to correspond to the different channels corresponding to the different chips CE1, CE2 to CEN and, accordingly, the write data requested to be written on the different host pages HPage1, HPage2 to HPageN are temporarily stored into the first set of cache spaces in the cache spaces Cache1_CE1, Cache1_CE2 to Cache1_CEN, respectively. As shown, the write data for the host page HPage1 is temporarily stored by the cache space Cache1_CE1, the write data for the host page HPage2 is temporarily stored by the cache space Cache1_CE2 ... the write data for the host page HPageN is temporarily stored by the cache space Cache1_CEN. Some host pages may be just partially written with data. For example, the beginning of host page HPage1 and the ending of host page HPageN for the write operation shown in FIG. 2 may be just partially written with data. As shown, the non-refreshed data HPage1_Old and HPageN_Old are retrieved from the FLASH memory 106 and copied to the cache spaces Cache1_CE1 and Cache1_CEN of the random access memory 114 to be combined with the partial data issued from the host 104. In this manner, complete data for the host pages HPage1, HPage2 to HPageN is prepared in the first set of cache spaces Cache1_CE1, Cache1_CE2 to Cache1_CEN (i.e., for each logical address, one unit size of data for a FLASH memory write operation is ready in the cache space corresponding thereto) to be written into the FLASH memory 106 via the plurality of channels corresponding to the chips CE1, CE2 to CEN. Similarly, data arrangement is performed in the second set of cache spaces Cache2_CE1, Cache2_CE2 to Cache2_CEN.

Figure 3:
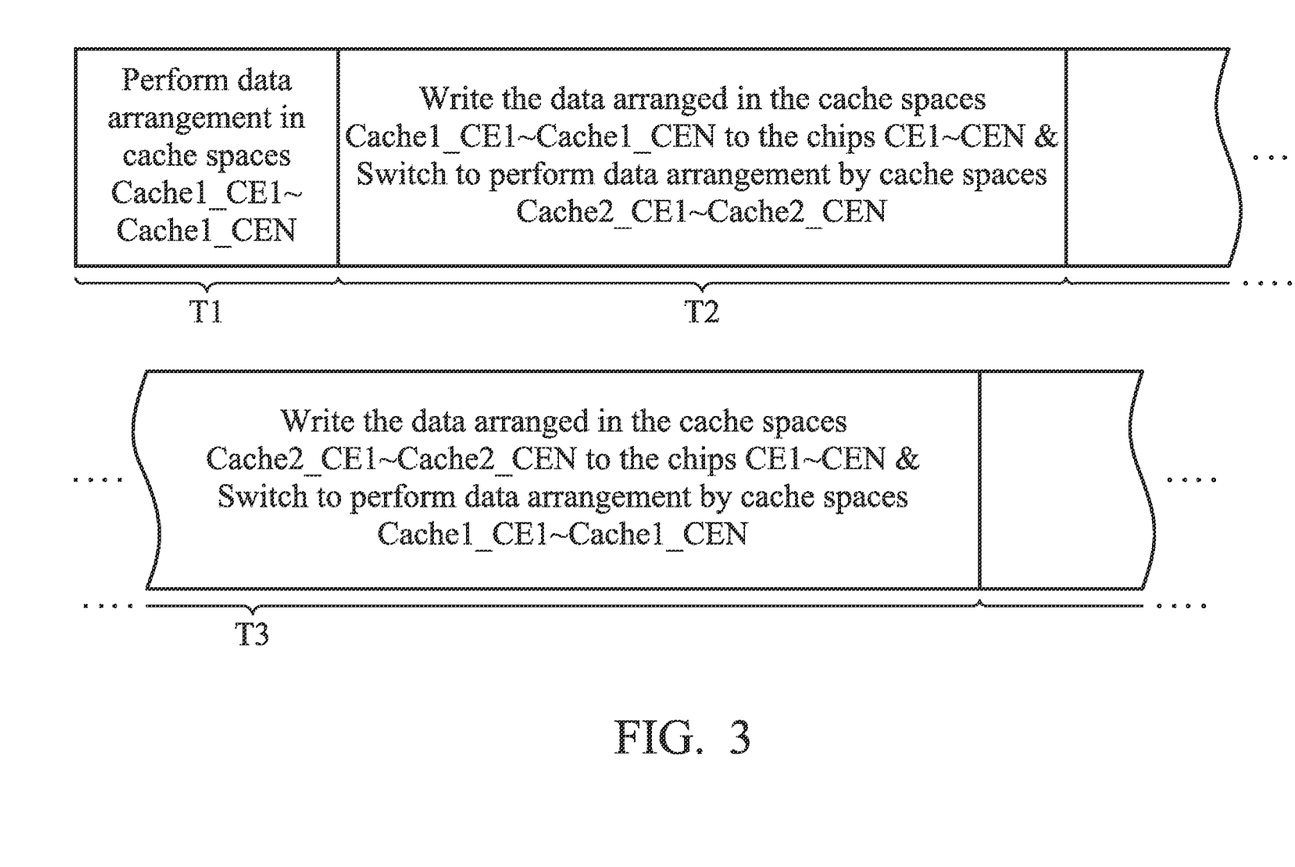
FIG. 3 is a timing diagram depicting how to use a first set of cache spaces Cache1_CE1, Cache1_CE2 . . . Cache1_CEN and a second set of cache spaces Cache2_CE1, Cache2_CE2 . . . Cache2_CEN.

FIG. 3 is a timing diagram, depicting how to use the first set of cache spaces Cache1_CE1, Cache1_CE2 ... Cache1_CEN and the second set of cache spaces Cache2_CE1, Cache2_CE2 ... Cache2_CEN. During a time period T1, data arrangement is performed in the first set of cache spaces Cache1_CE1, Cache1_CE2 to Cache1_CEN. During a time period T2, data collected in the first set of cache spaces Cache1_CE1, Cache1_CE2 to Cache1_CEN is written to the FLASH memory 106 via the channels corresponding to the chips CE1, CE2 to CEN corresponding to the cache spaces Cache1_CE1, Cache1_CE2 to Cache1_CEN. Referring to FIG. 1, one super page collected in the cache space Cache1_CE1 is written into K pages PAGE111 to PAGE11K of K blocks of the FLASH memory 106 via the channel corresponding to chip CE1. One super page collected in the cache space Cache1_CE2 is written into K pages PAGE121 to PAGE12K of K blocks of the FLASH memory 106 via the channel corresponding to chip CE2. And so on, one super page collected in the cache space Cache1_CEN is written into K pages PAGE1N1 to PAGE1NK of K blocks of the FLASH memory 106 via the channel corresponding to chip CEN. Note that during the time period T2, data arrangement is performed in the second set of cache spaces Cache2_CE1, Cache2_CE2 to Cache2_CEN. Then, during a time period T3, the data collected in the second set of cache spaces Cache2_CE1, Cache2_CE2 to Cache2_CEN is written into the FLASH memory 106 via the channels corresponding to the chips CE1, CE2 to CEN corresponding to the cache spaces Cache2_CE1, Cache2_CE2 to Cache2_CEN. Referring to FIG. 1, one super page collected in the cache space Cache2_CE1 is written into K pages PAGE211 to PAGE21K of K blocks of the FLASH memory 106 via the channel corresponding to chip CE1. One super page collected in the cache space Cache2_CE2 is written into K pages PAGE221 to PAGE22K of K blocks of the FLASH memory 106 via the channel corresponding to chip CE2. And so on, one super page collected in the cache space Cache2_CEN is written into K pages PAGE2N1 to PAGE2NK of K blocks of the FLASH memory 106 via the channel corresponding to chip CEN. Note that during the time period T3, the data arrangement is switched back to use the first set of cache spaces Cache1_CE1, Cache1_CE2 to Cache1_CEN.

Figure 4:
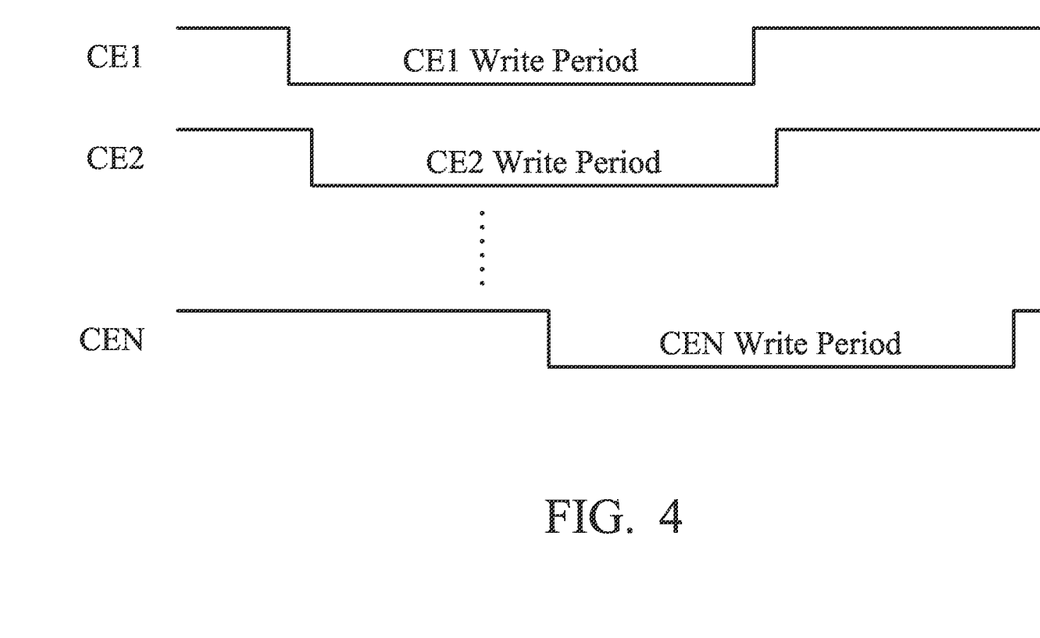
FIG. 4 shows write periods of the different channels corresponding to the different chips CE1 to CEN.

Thus, a data arrangement space is provided for write operations, and the schedule of data arrangement is shown. In this manner, the FLASH memory 106 is accessed with high efficiency via the multiple channels with improved performance. FIG. 4 shows write periods of the different channels of the different chips CE1 to CEN. As shown, except the short ready time, the write periods of the different channels are mostly overlapped. The FLASH memory 106 is accessed with high efficiency via the multiple channels.

Figure 5:
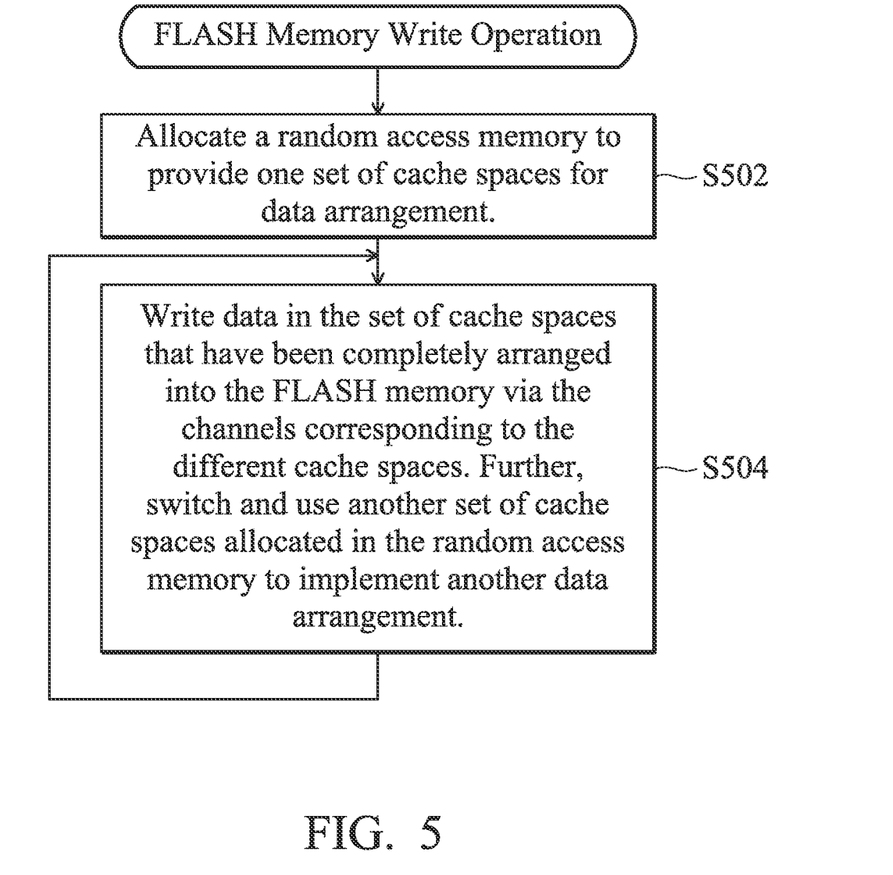
FIG. 5 is a flowchart depicting a write operation for a FLASH memory, wherein multiple sets of cache spaces are utilized.

FIG. 5 is a flowchart, depicting a write operation for a FLASH memory, wherein multiple sets of cache spaces are utilized. In step S502, a random access memory is allocated to provide a first set of cache spaces for data arrangement. Data in the first set of cache spaces that have been completely arranged is written into the FLASH memory via the channels corresponding to the different cache spaces in step S504 and a second set of cache spaces allocated in the random access memory is used to implement another data arrangement in step S504. Step S504 is performed repeatedly, and use of the sets of cache spaces is switched every time step S504 is performed.

Figure 6:
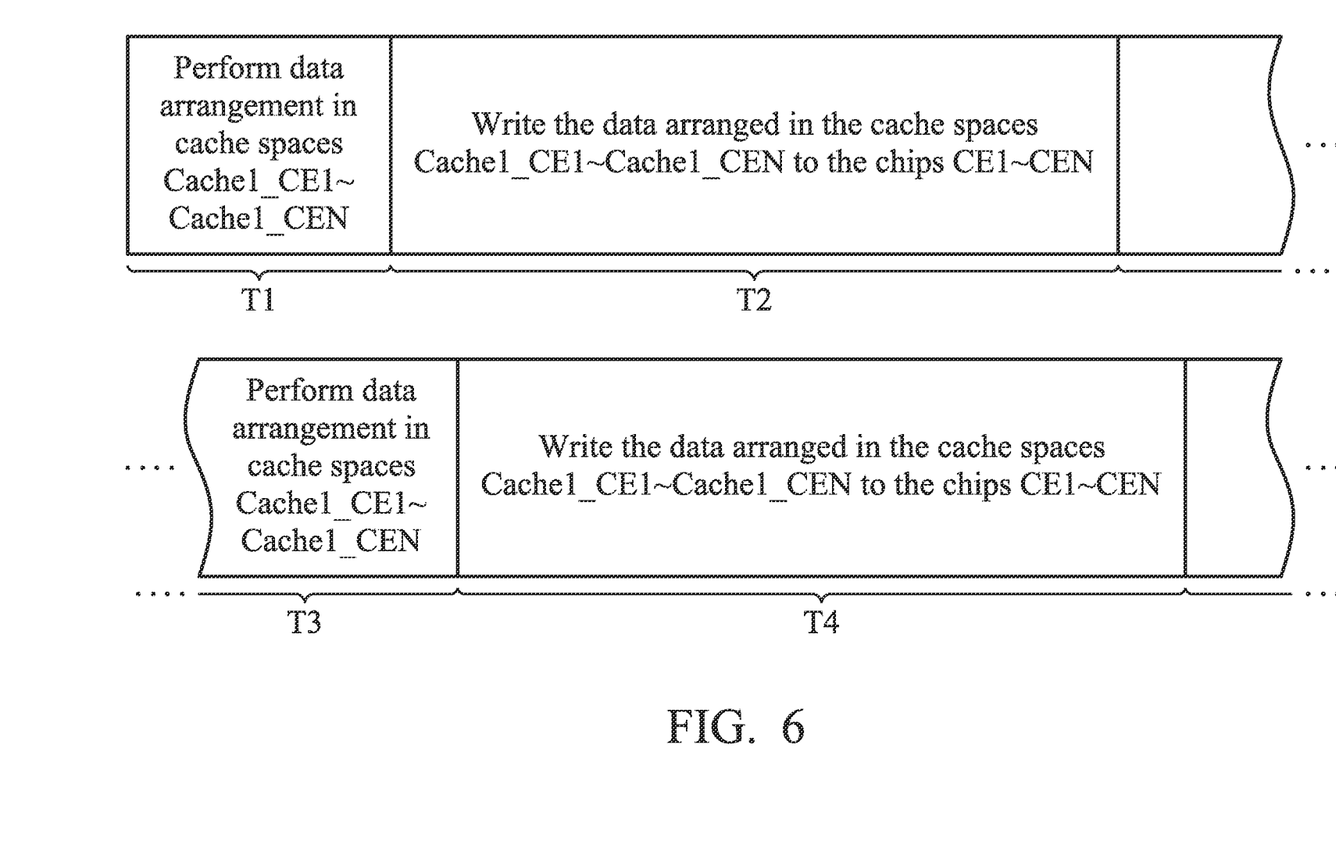
FIG. 6 is a timing diagram, depicting how to use one single set of cache spaces Cache1_CE1, Cache1_CE2 to Cache1_CEN.

In another exemplary embodiment, just one single set of cache spaces Cache1_CE1, Cache1_CE2 to Cache1_CEN is allocated in a small-sized random access memory. FIG. 6 is a timing diagram, depicting how to use one single set of cache spaces Cache1_CE1, Cache1_CE2 to Cache1_CEN. During a time period T1, data arrangement is performed in the single set of cache spaces Cache1_CE1, Cache1_CE2 to Cache1_CEN. During a time period T2, data collected in the single set of cache spaces Cache1_CE1, Cache1_CE2 to Cache1_CEN is written into the FLASH memory 106 via the channels corresponding to the chips CE1, CE2 to CEN corresponding to the cache spaces Cache1_CE1, Cache1_CE2 to Cache1_CEN. Referring to FIG. 1, one super page collected in the cache space Cache1_CE1 is written into K pages PAGE111 to PAGE11K of K blocks of the FLASH memory 106 via the channel corresponding to chip CE1. One super page collected in the cache space Cache1_CE2 is written into K pages PAGE121 to PAGE12K of K blocks of the FLASH memory 106 via the channel corresponding to chip CE2. Similarly, one super page collected in the cache space Cache1_CEN is written into K pages PAGE1N1 to PAGE1NK of K blocks of the FLASH memory 106 via the channel corresponding to chip CEN. During a time period T3, the single set of cache spaces Cache1_CE1, Cache1_CE2 to Cache1_CEN is reused for data arrangement. During a time period T4, data collected in the single set of cache spaces Cache1_CE1, Cache1_CE2 to Cache1_CEN is written to the FLASH memory 106 via the channels of corresponding to the chips CE1, CE2 to CEN corresponding to the cache spaces Cache1_CE1, Cache1_CE2 to Cache1_CEN. Referring to FIG. 1, one super page collected in the cache space Cache1_CE1 is written into K pages PAGE211 to PAGE21K of K blocks of the FLASH memory 106 via the channel corresponding to chip CE1. One super page collected in the cache space Cache1_CE2 is written into K pages PAGE221 to PAGE22K of K blocks of the FLASH memory 106 via the channel corresponding to chip CE2. And so on, one super page collected in the cache space Cache1_CEN is written into K pages PAGE2N1 to PAGE2NK of K blocks of the FLASH memory 106 via the channel corresponding to chip CEN. In comparison with the exemplary embodiment depicted in FIG. 3 which uses two sets of cache spaces, data arrangement performed by just one single set of cache spaces is performed after the entire data in the single set of cache spaces is moved into the FLASH memory 106, less flexible but still workable.

Figure 7:
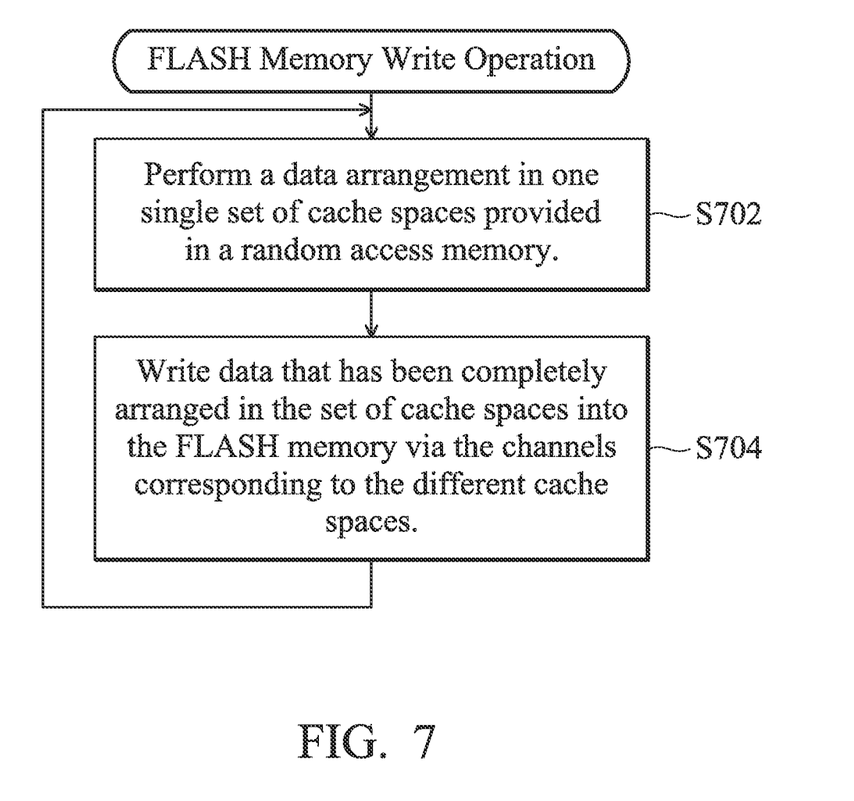
FIG. 7 is a flowchart, depicting a write operation for a FLASH memory, which allocates just one single set of cache spaces in a random access memory.

FIG. 7 is a flowchart, depicting a write operation for a FLASH memory, which allocates just one single set of cache spaces in the random access memory. In step S702, a data arrangement is performed in one single set of cache spaces provided in a random access memory. In step S704, data in the set of cache spaces that has been completely arranged is written into the FLASH memory via the channels corresponding to the different cache spaces. Steps S702 and S704 may be performed repeatedly.

The disclosed data storage device may be a memory card, a USB FLASH device, an SSD and so on. In another exemplary embodiment, a NAND FLASH chip and a control chip are packaged into one package by a multi-chip package technique, to form an eMMC.

According to the aforementioned techniques, codes may be programed for firmware implementation. The codes may be loaded into the read only memory 112 to be executed by the computing unit 110. However, the structure of the controller 108 is not intended to limit the controller architecture. Any technology using the same concept to control a FLASH memory is within the scope of the invention. In some exemplary embodiments, FLASH memory control methods are further disclosed, which are not limited to being performed by the controller structure 108 shown in FIG. 1.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data storage device, comprising:
   a FLASH memory, comprising a plurality of blocks each with a plurality of pages, wherein the blocks are further grouped to be accessed by a plurality of channels separately; and
   a controller coupled to the FLASH memory, comprising:
   a computing unit;
   a read only memory, loaded with programs to be executed by the computing unit to build firmware for the data storage device; and
   a random access memory, allocated according to the computing unit executing the firmware to provide a first set of cache spaces, wherein different cache spaces within the first set of cache spaces correspond to different ones of the plurality of channels, respectively, and every channel corresponds to one cache space of the first set of cache spaces,
   wherein:
   the computing unit separates write data issued from a host to correspond to the plurality of channels and, after data arrangement that combines non-refreshed data with write data in the first set of cache spaces for every channel is completed, the computing unit writes data arranged in the first set of cache spaces for every channel to the FLASH memory via the plurality of channels;
   the computing unit further allocates the random access memory to provide a second set of cache spaces, and different cache spaces within the second set of cache spaces correspond to the different ones of the plurality of channels, respectively and every channel corresponds to one cache space of the second set of cache spaces; and
   when writing the data arranged in the first set of cache spaces for every channel to the FLASH memory, the computing unit uses the second set of cache spaces to perform data arrangement for the write data issued from the host.

2. The data storage device as claimed in claim 1, wherein a unit size for a write operation for each channel of the FLASH memory is K pages, and K is a number.

3. The data storage device as claimed in claim 2, wherein the computing unit writes data that has been arranged in one unit size in one cache space of the first set of cache spaces to K pages of K blocks of the FLASH memory via the channel corresponding to the one cache space, each unit size corresponding to one write operation of the FLASH memory.

4. The data storage device as claimed in claim 1, wherein the computing unit separates the write data issued from the host to correspond to the plurality of channels and temporarily stores the write data into the first or the second set of cache spaces to be combined with non-refreshed data for data arrangement.

5. A FLASH memory control method, comprising:
dividing a plurality of blocks of a FLASH memory into groups to be accessed by a plurality of channels separately, each block comprising a plurality of pages;
allocating a random access memory to provide a first set of cache spaces, wherein different cache spaces within the first set of cache spaces correspond to different ones of the plurality of channels, respectively, and every channel corresponds to one cache space of the first set of cache spaces;
separating write data issued from a host to correspond to the plurality of channels;
after data arrangement that combines non-refreshed data with write data in the first set of cache spaces for every channel is completed, writing data arranged in the first set of cache spaces for every channel to the FLASH memory via the plurality of channels; and
allocating the random access memory to provide a second set of cache spaces, wherein different cache spaces within the second set of cache spaces correspond to the different ones of the plurality of channels, respectively, and every channel corresponds to one cache space of the second set of cache spaces,
wherein when data arranged in the first set of cache spaces for every channel is being written to the FLASH memory, data arrangement for the write data issued from the host is performed on the second set of cache spaces.

6. The FLASH memory control method as claimed in claim 5, wherein a unit size for a write operation for each channel of the FLASH memory is K pages, and K is a number.

7. The FLASH memory control method as claimed in claim 6, wherein data that has been arranged in one unit size in one cache space of the first set of cache spaces is written into K pages of K blocks of the FLASH memory via the channel corresponding to the one cache space, each unit size corresponding to one write operation of the FLASH memory.

8. The FLASH memory control method as claimed in claim 5, wherein the write data issued from the host is separated to correspond to the plurality of channels and temporarily stored into the first or the second set of cache spaces to be combined with non-refreshed data for data arrangement.

* * * * *